May 12, 1925.
W. H. STABLER ET AL
CAN TOP TESTING MACHINE
Filed Dec. 1, 1922
1,537,270
2 Sheets-Sheet 1
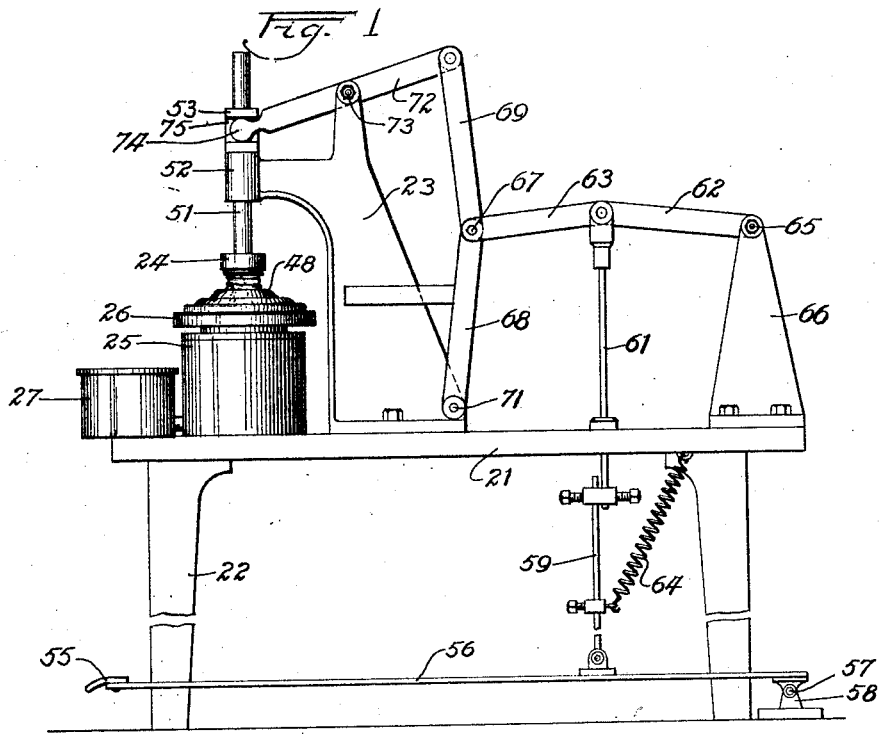
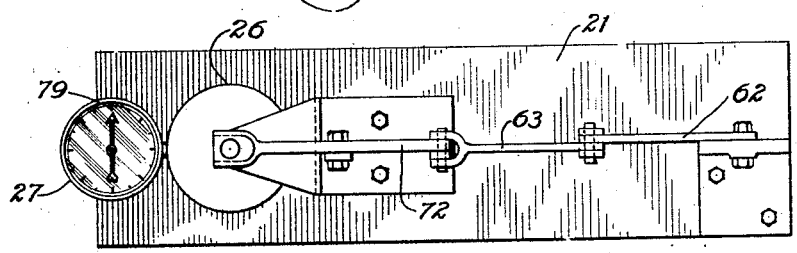

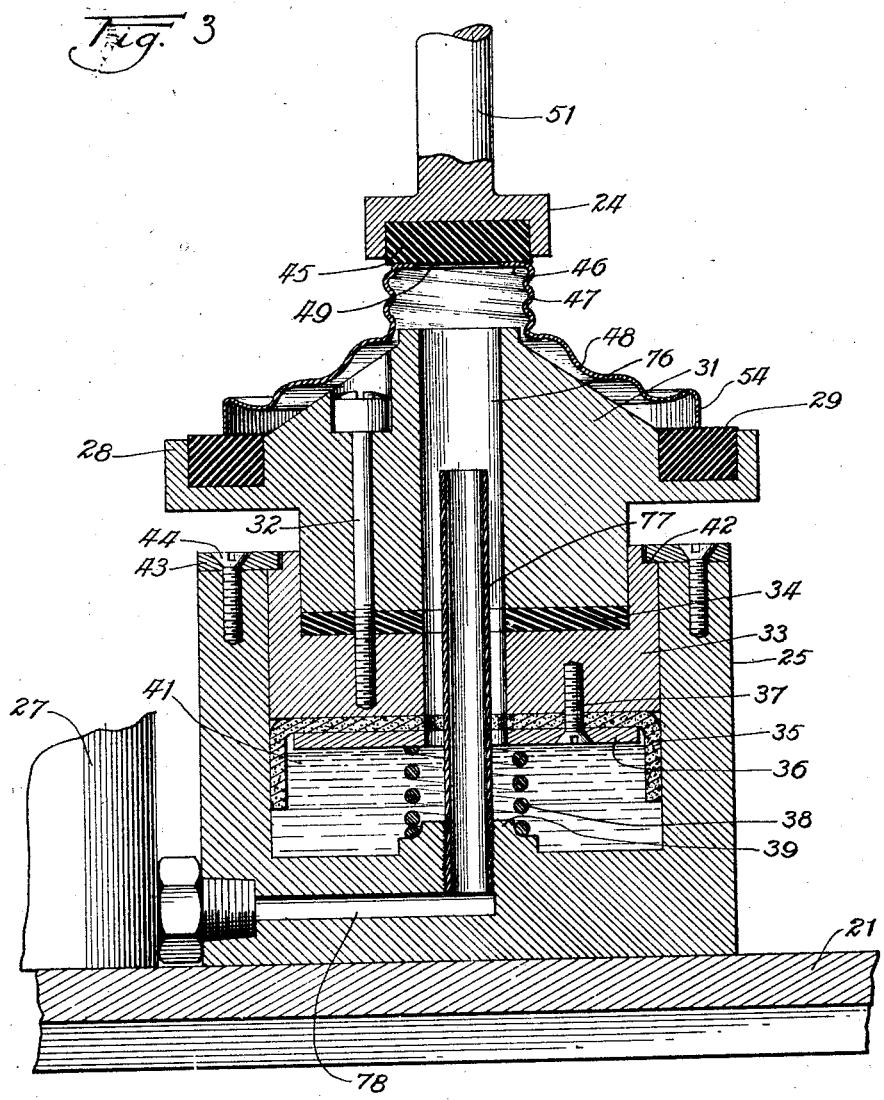

Patented May 12, 1925.

1,537,270

UNITED STATES PATENT OFFICE.

WILLIAM HENRY STABLER AND WILLIAM HOWARD AYRES, OF BALTIMORE, MARYLAND, ASSIGNORS TO AMERICAN CAN COMPANY, OF NEW YORK, N. Y., A CORPORATION OF NEW JERSEY.

CAN-TOP-TESTING MACHINE.

Application filed December 1, 1922. Serial No. 604,166.

*To all whom it may concern:*

Be it known that we, WILLIAM HENRY STABLER and WILLIAM HOWARD AYRES, citizens of the United States, residing in Baltimore, in the county of Baltimore and State of Maryland, have invented a new and useful Improvement in Can-Top-Testing Machines, of which the following is a specification.

Our invention relates in general to apparatus for testing formed sheet metal articles, such, for example, as drawn can tops, though it will be manifest that the invention has wider uses and may be employed in testing a wide variety of articles to determine whether any imperfections exist therein.

A principal object of the invention is the provision of an air tester adapted to be readily manipulated and to accurately indicate variations in pressure caused by the leakage of air through a defective can top, or like article.

A further object of the invention is the provision of an apparatus of this character particularly adapted for the testing of can tops of the type which are used for the packaging of harness oil, or the like, these tops being drawn in the process of formation and provided with a screw-threaded nozzle, with the resultant likelihood of over-strain of the drawn sections of the metal.

Other objects and advantages of the invention will be apparent as it is better understood from the following description, which, taken in connection with the accompanying drawings, discloses a preferred embodiment thereof.

Referring to the drawings,

Figure 1 is a side elevation, partly broken away, of an apparatus in which our invention is embodied, showing a top clamped upon its support;

Fig. 2 is a top plan view thereof; and

Fig. 3 is an enlarged vertical section through the top support and housing cylinder, showing the relative arrangement of these parts whereby the testing pressure is created.

The apparatus, as illustrated, comprises a table 21, supported upon legs 22 and having an upstanding bracket 23 secured thereto, said bracket providing a pivotal support for certain of the operating levers to be hereinafter described and having a clamping head 24 mounted therein for vertical reciprocation, a cylinder 25, forming a housing for a top supporting member 26, being mounted on the table adjacent said bracket 23. A suitable pressure gauge 27 is provided adjacent the cylinder 25 for the purpose of indicating variations in pressure beneath the top when the latter is clamped upon the supporting member 26 by means of the head 24 and said member forced to its downward position in the cylinder.

The member 26 is provided with a circumferential ledge 28 in which is positioned a rubber ring 29. The body 31 of said member 26 is of conical form, to conform generally to the contour of the top to be tested, and is secured, by means of a screw 32, to a piston body 33, a suitable washer 34 being provided between these parts and a leather cup washer 35 being provided at the bottom of the piston body 33 and secured thereto by means of a disk 36 and a screw 37. A spring 38 is provided in the cylinder chamber beneath the piston body and is held in place by a boss 39 formed in the bottom of said chamber and extending into the lower end of said spring. The cylinder chamber is partially filled with oil, indicated by the reference character 41, which provides an air seal to prevent leakage of air about the piston 33. The spring 38 yieldingly resists the downward movement of the piston and restores the same to its upper position upon removal of the pressure therefrom. The piston body 33 is cut away near its top to provide a shoulder 42 and a ring 43 is secured by means of screws 44 to the top of the cylinder 25 and extends inwardly therefrom to provide a stop against which the shoulder 42 rests when the piston is in its upper position.

The clamping head 24 is provided with a rubber disk 45, which is adapted to rest against the top 46 of a nozzle portion 47 in the top 48 and to close an opening 49 in said nozzle top. Said clamping head is provided with a shank 51, which extends through a bearing 52 in the bracket 23, and a grooved collar 53 is provided upon the upper end of said shank 51.

The tops to be tested are positioned upon the member 26, with the depending edge flange 54 resting upon the rubber ring 29. Pressure is then exerted upon a foot treadle 55 on a bar 56, which is pivoted at 57 to a bracket 58 secured to the floor. Said bar 56 is connected by means of links 59 and 61 with horizontal links 62 and 63 and is held in its upward position by means of a spring 64 secured at one end to the link 59 and at the opposite end to the underside of the table 21. The link 62 is pivoted at 65 to a bracket 66 upstanding from the rear of the table 21 and the link 63 is connected to the pivot point 67 between vertical links 68 and 69, the former being pivoted at 71 to the bracket 23 and the latter to a horizontal lever 72. Said lever 72 is centrally pivoted at 73 to an upper extension of the bracket 23 and has its forward end 74 positioned in the groove 75 of the collar 53. It will be manifest that pressure upon the foot treadle 55, through the instrumentality of the levers just described will exert downward pressure upon the clamping head 24, causing the latter to firmly secure the top upon the rubber ring of the supporting member 26 and to force said member downwardly in the cylinder 25.

An air passage 76 is provided through the body 31 of the top support and through the piston body 33 and this passage is communicably connected by a tube 77, with an outlet passage 78 at the bottom of the cylinder. The air in said passages obviously is compressed by the downward movement of the piston and the pressure is indicated on the dial 79 of the gauge 27. The treadle 55 is held depressed for a short space of time and if a variation is noted in the reading of the dial 79, a leaky top is indicated and may be discarded.

It is thought that the invention and many of its attendant advantages will be understood from the foregoing description, and it will be apparent that various changes may be made in the form, construction and arrangement of the parts, without departing from the spirit and scope of the invention, or sacrificing all of its material advantages, the form hereinbefore described being merely a preferred embodiment thereof.

We claim:

1. An apparatus for testing hollow articles having in combination, a movable support on which the article may rest by gravity, said support having a sealing means for closing to the passage of air the space within said article and a passage leading from said space, a pressure gauge communicating with said passage, and means for depressing said article and thereby causing the operation of said sealing means and also the movement of said support, whereby air pressure is increased within the article and said pressure is communicated to said gauge.

2. Apparatus for testing drawn can tops and the like, comprising a support upon which the tops may be sealed and having an air passage therethrough, means housing said support and permitting relative movement thereof, said housing means being provided with an air passage communicably connected with the air passage in said support, means for causing movement of the support relative to said housing to compress the air in said passages, and means for indicating the air pressure thus created and denoting variations therein.

3. Apparatus for testing drawn can tops and the like, comprising a support upon which the tops are adapted to be clamped with a closed intervening air space, a housing in which said support is yieldingly sustained, said housing and said support being provided respectively with air passages, means providing telescopic connection between said passages, means for moving said support in said housing, and means for registering the air pressure in said passages.

4. Apparatus for testing drawn can tops and the like, comprising a fixed housing, a member movable in said housing and providing a support for a can top, means for clamping a top upon said support and moving said member relative to said housing, said member and said housing being provided with communicating air passages extending from a space beneath the top, and means for indicating the air pressure in said passages.

5. Apparatus for testing drawn can tops and the like, comprising a fixed housing, a member movable in said housing and providing a support for a can top, means for clamping a top upon said support and moving said member downwardly in said housing, means yieldingly resisting the downward movement of said member and returning the same to normal upper position upon removal of pressure therefrom, said member and said housing being provided with connecting air passages communicating with the interior of the can top, and means for indicating the air pressure in said passages when said member is in its lower position.

6. Apparatus for testing drawn can tops and the like, comprising telescopically arranged members provided with connected air passages, means for securing a top to be tested upon one of said members and moving the latter relative to the other member, the air in said passages and beneath said top being compressed by said relative movement, and means for indicating variations of air pressure while the top is being tested.

7. Apparatus for testing drawn can tops and the like, comprising telescopically arranged members provided with communicating air passages, means for moving one of said members relative to the other and for clamping a top thereon with a closed air space therebeneath and communicating with said air passages, and a pressure gauge for registering the pressure in the space beneath said top.

8. Apparatus for testing hollow articles, comprising a movable support for said article, means for holding an article thereon with a sealed air space beneath it, said support having an air passage therefrom, means for creating pressure in said space, and means having a duct communicating with said air passage for indicating variations of said pressure occasioned by a defective article.

9. An apparatus for testing hollow articles having in combination, a movable support on which the article may rest by gravity, said support having a sealing means for closing to the passage of air the space within said article and a passage leading from said space, means producing a liquid seal beneath said movable support, a pressure gauge communicating with said passage, and means for depressing said article and thereby causing the operation of said sealing means and also the movement of said support, whereby air pressure is increased within the article and said pressure is communicated to said gauge.

WILLIAM HENRY STABLER.
WILLIAM HOWARD AYRES.